Feb. 18, 1941.   J. McD. IDE   2,232,177
OPTICAL SYSTEM
Filed June 10, 1939   2 Sheets-Sheet 1

Inventor: John McDonald Ide
By his Attorney:

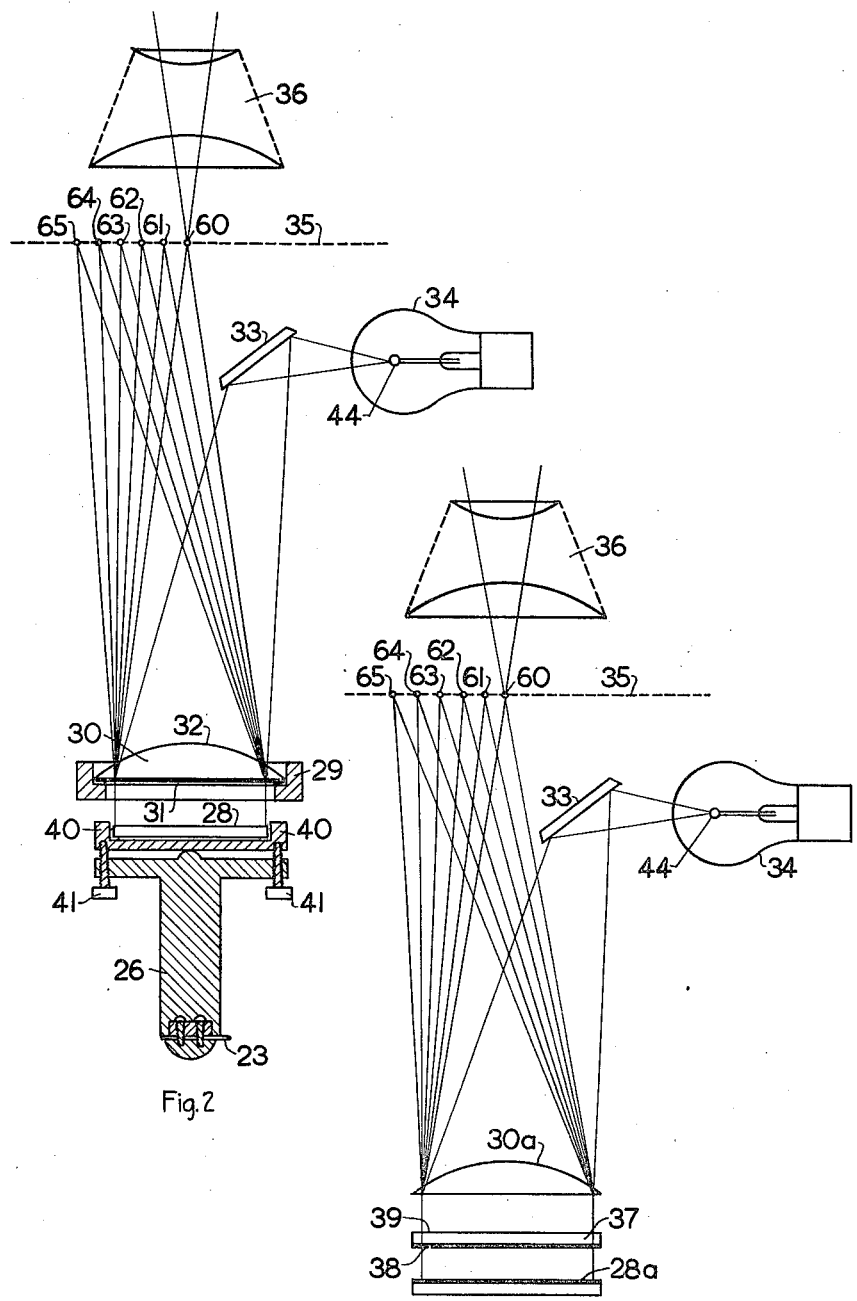

Patented Feb. 18, 1941

2,232,177

UNITED STATES PATENT OFFICE 2,232,177

OPTICAL SYSTEM

John McDonald Ide, Houston, Tex., assignor to Shell Development Company, San Francisco, Calif., a corporation of Delaware Application June 10, 1939, Serial No. 278,436

4 Claims. (Cl. 88—24)

This invention relates to optical systems and pertains more particularly to an improvement in a multiple-reflection optical system such as described in U. S. Letters Patent No. 2,131,738, issued October 4, 1938, to Archer Hoyt.

So-called light-beam pointer optical systems are commonly used in combination with physical measuring instruments, such, for example, as gravity meters, torsion balances, etc., for the purpose of magnifying the scale readings and thereby increasing the experimental accuracy and sensitivity of the apparatus while reducing its size.

The above-mentioned Letters Patent No. 2,131,738 describes an optical system comprising a pair of plane, partially transparent mirrors arranged substantially parallel to each other, one mirror being fixed and one attached to a movable part of a measuring apparatus, a source of light, means for directing a collimated beam of light from the source through the mirrors substantially at right angles to the plane of the mirrors, and means for bringing the collimated beam to a focus at a focal plane after its passage through the mirrors, so that upon movement of the apparatus part, the mirror attached thereto is tilted with regard to the fixed mirror and inter-reflections occur between the mirrors, whereby a series of images of the source is formed on a screen scale placed at the focal plane. The distance measured on the scale between the undeflected image and any one of the consecutive deflected images selected by the observer serves as a measure of the angular deflection of the movable apparatus part.

Since the accuracy and the sensitivity of the Hoyt optical system depends on the number of images which the observer is capable of perceiving on the scale, it is the object of the present invention to provide an improved optical system of the multiple reflection type comprising one partially transparent and partially reflecting mirror and one non-transparent totally reflecting mirror, whereby the amount of light losses is substantially decreased, and the accuracy and sensitivity of the device is improved due to the increased intensity of the images and the possibility of observing a greater number of said images on the screen.

This and other objects of the invention, which will be apparent from the following description, are achieved by providing an optical indicating system which includes essentially a projection lens, a mirror which is partially transmitting, and a mirror which is completely reflecting. The partially transparent mirror may be combined with a lens, or may be a separate element. Either mirror may be attached to a movable or deflectable member of the measuring apparatus, the other mirror being fixed. A source of light and a screen are provided in such a manner that the source is imaged on the screen after reflection by the mirrors and two transmissions through the lens. Upon angular deflection of the moving element, a series of images due to multiple reflection appears on the screen, each of which images indicates the actual angular deflection multiplied by a different factor.

The present improved optical system will be described in its adaptation to a gravity meter, it being understood that it can equally well be applied to other physical measuring instruments. In the annexed drawings, Fig. 1 diagrammatically shows the present optical system adapted for use with a torsion-wire gravity meter;

Fig. 2 is a diagrammatic view of one embodiment of the optical system of Fig. 1;

Fig. 5 is a diagrammatic view of another embodiment of the present optical system.

Figure 1:
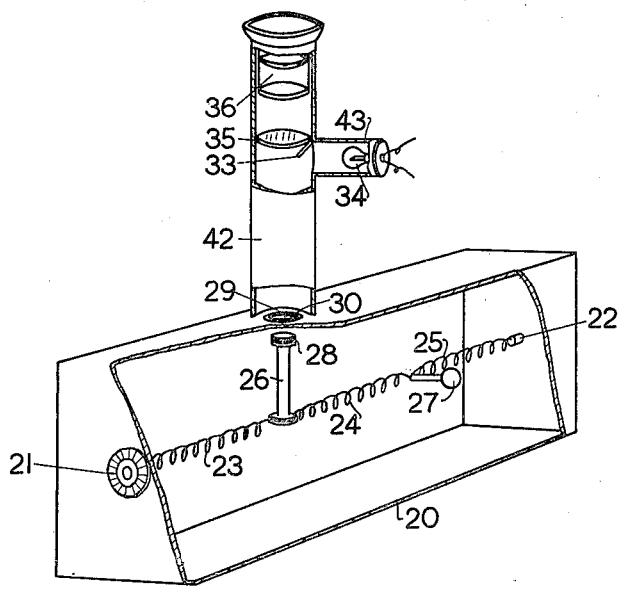

Identical reference characters being used throughout to denote the same reference parts, Fig. 1 diagrammatically shows a torsion spring gravity meter such, for example, as described in my co-pending application Serial No. 186,423, filed January 22, 1938, which comprises a casing 20 and three helical springs or sections of torsion wire 23, 24 and 25, having their outer ends clamped in the bearings 21 and 22 supported by the casing. The springs support eccentrically loaded weights or levers 26 and 27 on which the force of gravity acts in such a manner as to deflect the levers until equilibrium is reached due to the restoring forces provided by the twisted springs.

The values of the spring constants and of the torque moments of the levers are so proportioned that a very slight change in the gravitational force, for example, one part in a million, is able to effect a measurable change in the twisting moment of the lever or member 26, to which a mirror 28 is attached by means of an annular mounting 40, as shown in Fig. 2. The twist in all cases is of very small magnitude, making desirable a highly sensitive optical system to secure accuracy of readings.

There is affixed to the casing 20 directly above the mirror 28 an annular mounting 29 retaining a lens-mirror 30 having a convex unsilvered face 32 and a flat face 31 forming a mirror. The lens is made of any optically suitable material, such as glass, quartz, etc. The flat face 31 is silvered to form a partially transparent mirror, that is, a partially light-transmitting film of silver, aluminum, platinum or any other reflecting material is applied thereto in a manner known to the art. If desired, said plane face may, however, be left unsilvered, since plain glass surfaces reflect light to a certain extent, and form therefore natural mirror surfaces. The mirror 28 may be of any suitable material, transparent or opaque. If the mirror 28 is of glass or other transparent material, a reflecting metallic film may be placed on either of its two plane faces; if it is of opaque material, such as highly polished speculum metal or stainless steel, the reflecting surface is obviously the surface adjacent to the lens mirror 30. The reflecting surfaces 28 and 31 are parallel in the normal or zero position of the apparatus. If necessary, screws 41 or bearings 21 and 22 are adjusted to bring the reflecting surfaces, which are closely adjacent, into parallelism.

As shown in Fig. 1, the casing 20 has a housing 42 attached thereto. The upper part of this housing contains an eye-piece 36 and a transparent screen provided with a scale 35. A side-tube 43, projecting from housing 42, contains a light source 34 preferably with a straight filament 44 at right angles to the plane of Fig. 2. The light from this incandescent filament is reflected by a mirror 33, positioned at a suitable angle, or by any other suitable means, such as a Gauss plane disposed below the scale 35. It is understood that instead of the screen and scale arrangement shown, the observing means may comprise a micrometer eye-piece with cross hairs, or photographic recording material, the term screen being used herein to define the focal plane of the eye-piece and any receiving surface upon which the images are focussed. Instead of the incandescent lamp filament, a light bulb containing a lens and adjustable slit may be used as a light source for the production of the indicating images.

The operation of the optical system is diagrammatically shown in Fig. 2. The filament 44 is disposed at the principal focus of the lens 30 so that the light which falls upon the mirror 28 consists of substantially parallel or collimated beams. On reflection from the mirror 28 and re-passage through the lens 30, the light is brought to a focus on the screen 35. When the faces 31 and 28 are parallel, the filament 44 is imaged on the screen at 60. This is the normal or zero position of the system. Upon angular deflection of the lever 26, the reflecting surfaces become no longer parallel. Inter-reflections occur between the mirror faces 28 and 31, the course of the rays being diagrammatically shown in Fig. 3. Each inter-reflected bundle of rays gives rise to an image on the screen, as indicated at 61', 62, 63, 64 and 65, in Fig. 2. A large number of images is produced, of which only six are shown for clearness. The appearance of the screen 35, which if desired may for convenience carry a graduated scale 35a, as seen in the eye-piece is indicated in Fig. 4, the directly reflected image 60 and the higher order images appearing as shown. Image 60, produced by reflection from surface 31, serves as a reference line, since it is unaffected by the angular motion of mirror 28.

Figure 3:
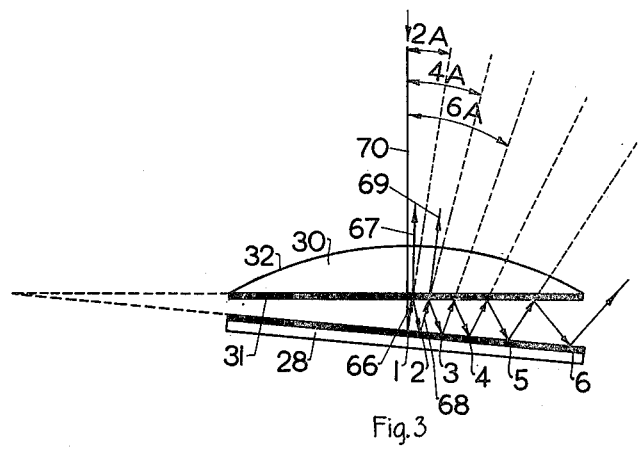
Fig. 3 is a diagram illustrating the operation of the present optical system.
Figure 4:
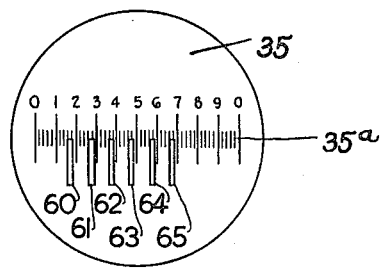
Fig. 4 is a view of the screen and scale arrangement of the present optical system.

Each of the images, due to reflection and inter-reflection, represents the angular displacement of post 26, angularly amplified by a factor depending on the number of reflections resulting in said image, as indicated in Fig. 3. The observer selects any one of the images, such as the $n$th image, and determines its distance on the scale from the zero or undeflected image, from which reading the actual angular deflection of the member 26 may be easily calculated, the number of the image and the constants of the apparatus being known. Since the accuracy of the readings increases with an increase in the actual distance on the scale between the zero image and a particular $n$th image selected for the reading, and since this distance increases with each consecutive deflected image, it becomes of importance to increase the number of images distinguishable on the screen, or, in other words, to increase the intensity of said images.

It will be seen from the preceding that the present apparatus is generally similar in principle and operation to that described in the above-mentioned Letters Patent No. 2,131,738. It has, however, some particular advantages which may be briefly summarized as follows:

As already pointed out, the accuracy and sensitivity of a multi-reflection optical system depends on the number of images which the observer is capable of distinguishing on the scale. The number of said distinguishable images, which are of a consecutively attenuated intensity, is a function of the light transmission and light reflection factors of the system. Since the intensity of the $n$th image depends on $(2n-2)$ reflections in the Hoyt system, or on $(2n-1)$ reflections in the present system, but only on 2 transmissions in either system, the reflection factor is by far the more important of the two. In order to obtain the greatest efficiency, the mirror faces should in all cases be highly reflecting and only slightly transparent. Since the present system uses one partly transparent and one totally reflecting mirror instead of Hoyt's two partly transparent mirrors, and since a totally reflecting mirror has obviously a higher reflection factor than any partly transparent mirror, the present system has a greater light efficiency than the Hoyt system. In other words, expressing the above in terms of light losses, the light received in the inter-mirror space of Hoyt is partly transmitted further toward the observer, where it is used to form the desired images, and partly reflected back towards the light source, where it is entirely wasted. In the present system, no light is allowed past the totally reflecting mirror, the total amount of light being reflected back towards the observer. The amount of light losses is thus reduced by approximately a factor of two. The intensity of the desired images, and consequently the number of distinguishable images is therefore increased, and the accuracy and the sensitivity of the device is improved.

Certain modifications of the present apparatus may have utility in particular installations, and may be effected without departing from the spirit of the invention. Thus, it may be advisable to attach the lens 31 to the moving part of the apparatus, and to retain the mirror 28 in a fixed position. Another modification is to employ separate parts for the lens 30 and the partially transmitting surface 31, as shown in Fig. 5. This figure shows a fixed plano-convex lens 30a, a plate of glass or other transparent material 37, having optically flat parallel surfaces 38 and 39, one of them, preferably 38, being partially silvered. The element 37 is thus a partially transmitting mirror and may be fixed, in which case the mirror 28a is attached to the moving portion of the apparatus; or, if preferred, the mirror 28a may be fixed and the partially transmitting plate 37 may be attached to the moving portion of the apparatus. The operation of such device is similar to that described in connection with the arrangement of Fig. 2.

The arrangement of Fig. 5 is particularly useful when it is desired to suspend a gravity meter in a liquid as described in my co-pending application Serial No. 186,423, filed January 22, 1938. In this case, a glass lens may have substantially the same refraction index as the liquid in which the gravity meter is immersed so that the convex surface of the lens must be held above the liquid in order to operate as an optical element. The fixed or reference image may then be obtained by reflection from the plate 37 which is attached to the suspended case of the gravity meter. The completely reflecting mirror 28 is attached to the lever 26 or its mechanical equivalent in the form of a floating sphere or cylinder, as described in said co-pending application.

I claim as my invention:

1. In an optical system for observing the angular deflection of a movable member of a measuring apparatus, a partially transparent and a totally reflecting mirror normally substantially parallel to each other, one mirror being fixed and one being attached to said movable member, a light source, means for directing a collimated beam of light through said transparent mirror to said totally reflecting mirror in a direction substantially perpendicular to the plane of said mirrors, means for bringing said beam to a focus at a focal plane after its reflection from said mirrors, said focal plane being located to the same side of said mirrors as the light source, and a screen positioned in said focal plane whereby a series of images of the light source is formed on said screen at said focal plane by the interreflections occurring between the mirrors when said mirrors are moved out of parallelism upon an angular displacement of the member supporting one of said mirrors.

2. In an optical system for observing the angular deflection of a movable member of a measuring apparatus, a partially transparent and a totally reflecting mirror normally substantially parallel to each other, one mirror being fixed and one being attached to said movable member, a light source, a lens between said mirrors and said light source, said lens being adapted to direct a collimated beam of light through said transparent mirror to said totally reflecting mirror and to bring said beam to a focus at a focal plane after its reflection from said mirrors, said focal plane being located to the same side of said mirrors as the light source, and a screen positioned in said focal plane whereby a series of images of the light source is formed on said screen at said focal plane by the interreflections occurring between the mirrors when said mirrors are moved out of parallelism upon an angular displacement of the member supporting one of said mirrors.

3. In an optical system for observing the angular deflection of a movable member of a measuring apparatus, a light source, an optical element comprising a totally reflecting mirror, a second optical element comprising a convex lens having one flat face, a partially transparent mirror film on said face, said face being normally substantially parallel to the totally reflecting mirror, one of said optical elements being fixed and one being attached to said movable member, said lens being adapted to direct a collimated beam of light through said transparent mirror to said totally reflecting mirror and to bring said beam to a focus at a focal plane after its reflection from said mirrors, said focal plane being located to the same side of said mirrors as the light source, and a screen positioned in said focal plane whereby a series of images of the light source is formed on said screen at said focal plane by the interreflections occurring between the mirrors when said mirrors are moved out of parallelism upon an angular displacement of the member supporting one of said mirrors.

4. The system of claim 1, wherein the totally reflecting mirror is formed of a highly polished metallic body.

JOHN McDONALD IDE.